Nov. 29, 1960  C. C. GILLASPIE  2,962,632
OVERLOAD PROTECTION DEVICE FOR DIRECT CURRENT GENERATORS
Filed Jan. 19, 1959
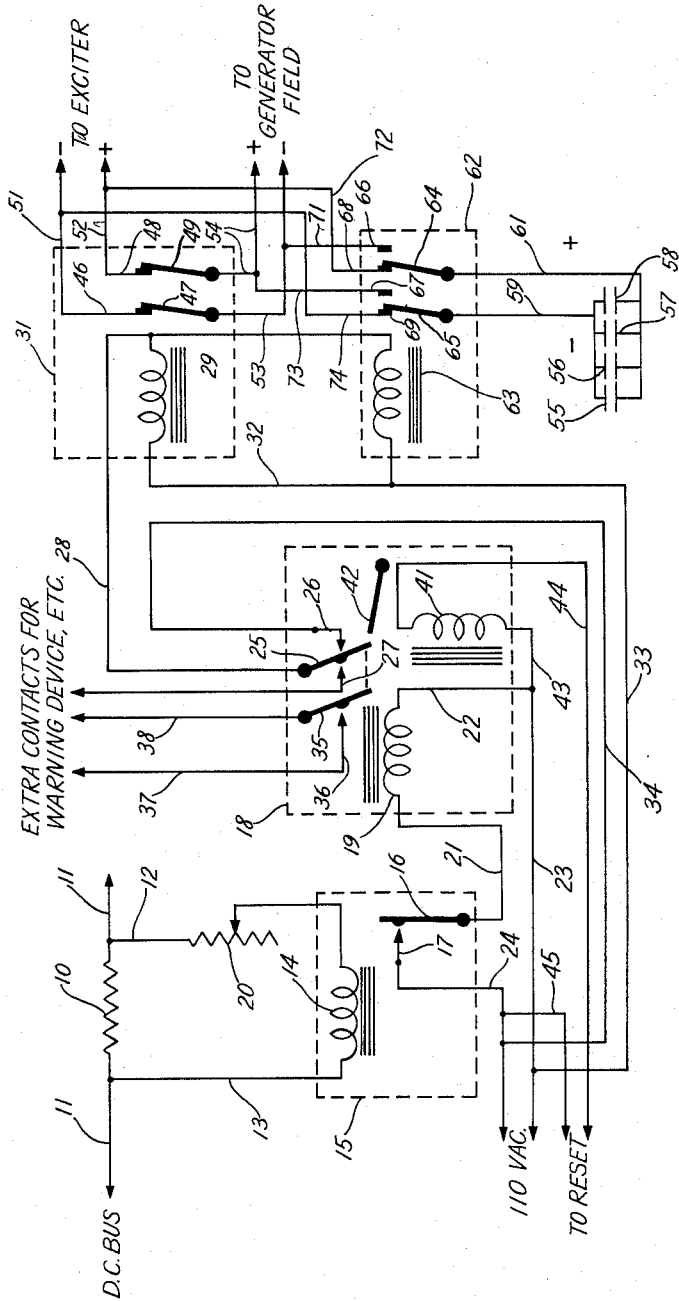

2,962,632

OVERLOAD PROTECTION DEVICE FOR DIRECT CURRENT GENERATORS

Charles Cephas Gillaspie, Seattle, Wash., assignor to the United States of America as represented by the Secretary of the Interior Filed Jan. 19, 1959, Ser. No. 787,781

11 Claims. (Cl. 317—13)

(Granted under Title 35, U.S. Code (1952), sec. 266)

The invention described herein may be manufactured and used by or for the Government of the United States for governmental purposes without the payment to me of any royalty thereon in accordance with the provisions of 35 U.S.C. 266.

This invention relates to a new and improved overload protection device and more particularly to such a device to be used with direct current generators.

The problem of protecting direct current generators subject to a heavy load current from overloads has always required an overload protection device which, while being dependable, is fast enough to avoid any damage to the generators' current carrying lines and connected equipment. At the same time such a device has to be resettable and readily replaceable. Such devices have usually taken the form of quick acting relay switches which under overload conditions will disconnect the generator from the busses and loads in a small fraction of a second. It has been found that even within such a small period of time damage can be done to generators' lines and loads where the normal line current is relatively large. Applicant's invention overcomes this basic problem by providing for a dependable overload device having a fast "drop out" time while also having a fast recovery time.

Accordingly, it is an object of this invention to provide a new and improved overload protection device for direct current generators to protect such generators from overloads that could produce ring firing of the generator commutator and possible damage to the generator brushes and windings.

Another object of this invention is to provide a new and improved overload protection device for direct current generators which while low in cost of manufacture requires little maintenance, has small physical size, is easily resettable, has a fast recovery time and fast "drop out" time.

A further object of this invention is to provide an improved overload protection device for direct current generators which provides for reverse flashing means for the generator field at the time of the actuation of the device.

Other objections and advantages of the invention will be apparent during the course of the following description, when read in connection with the accompanying drawings wherein:

The single figure is a schematic wiring diagram of a preferred embodiment of applicant's new and improved overload protection device.

A D.C. shunt 10 is connected as a current flow sensing element in series with the D.C. bus 11. The D.C. bus 11 carries the load from a generator to be protected against overloads by applicant's device. The D.C. shunt 10 may be a standard direct current ammeter shunt. The voltage developed across the D.C. shunt 10 is applied through leads 12 and 13 to an overload sensing relay coil 14 and a variable resistor 20 connected in series. The overload sensing relay coil 14 is the actuating coil of a sensitive relay 15 having normally open contacts 16 and 17. The variable resistor 20 is calibrated so as to cause operation of the overload sensing relay 15 at any desired preset current through the shunt 10. Thus the variable resistor 20 can be preset to any output level of the generator so that the overload sensing relay 15 will not be actuated under normal loads. If an overload condition should develop, the overload sensing relay 15 will be actuated and its contacts 16 and 17 closed.

An overload actuating relay 18 has its actuating coil 19 connected at one end through wire 21 to contact 16 of overload sensing relay 15. The other end of the overload actuating relay coil 19 is connected through leads 22 and 23 to one side of a 110 volt A.C. voltage source. The overload sensing relay contact 17 is connected through a lead 24 to the other side of the 110 volt A.C. voltage source.

The overload actuating relay 18 has a single pole double throw set of contacts with the movable switch contact 25 normally in contact with a contact 26 and, upon actuation of the relay 18, in contact with relay element 27. Movable relay element 25 is connected through a lead 28 to one side of a shunt field disconnect coil 29 of a shunt field disconnect relay 31. The other side of the shunt field disconnect relay coil 29 is connected through leads 32 and 33 to one side of a 110 volt A.C. source. The other side of this 110 volt A.C. source is connected through a lead 34 to relay contact 26 of the overload actuating relay 18.

Actuation of the overload actuating relay 18 also closes contacts 35 and 36 which, through leads 37 and 38, connected to these contacts are used to actuate a perceptive warning device, such as a buzzer or light.

At the time of the energization of overload actuating relay coil 19, a latch 42, being spring loaded, drops in and holds the overload actuating relay 18 in its energized position.

Overload hold relay coil 41 has one end connected through leads 43 and 23 to one side the 110 volt A.C. voltage source. The other side of the overload hold relay coil 41 is connected through a lead 44 to one side of a reset switch (not shown). The other side of the reset switch is connected to a lead 45 which in turn is connected to the other side of the 110 volt A.C. source.

Actuation of shunt field disconnect relay 31 closes two pairs of normally open contacts 46—47 and 48—49. Closing of these contacts connects a D.C. exciter voltage through leads 51—52 and 53—54 to the generator field of the direct current generator to be protected by the device.

A capacitor bank consisting of a plurality of capacitors 55, 56, 57 and 58 has its capacitors connected in parallel to two leads 59 and 61. A polarity reversing relay 62 is actuated by a relay coil 63. Two movable relay contacts 64 and 65 are connected to contacts 66 and 67, respectively, when the polarity reversing relay 62 is not energized. When the polarity reversing relay 62 is energized the movable contacts 64 and 65 are connected to contacts 68 and 69, respectively. Leads 59 and 61 are connected, respectively, to movable contacts 65 and 64 of the polarity reversing relay 62.

Contact 66 of relay 62 is connected through a lead 71 to lead 53. Contact 68 of relay 62 is connected through a lead 72 to lead 52. Contact 67 of relay 62 is connected through a lead 73 to lead 54. Contact 69 of relay 62 is connected through a lead 74 to lead 51.

If a short should occur in the load at a current level greater than that which was preset by variable resistor 20 overload sensing relay 15 will be actuated, energizing coil 19 of overload actuating relay 18. The contacts 25, 26, of relay 18 will then deenergize actuating coils 29 and 63 of relays 31 and 62. Deenergizing relay 31 disconnects the shunt field of the generator from its source of excitation by opening normally closed contacts 46—47 and 48—49.

The deenergization of relay 62 puts into position movable contacts 64 and 65 so as to connect lead 61 to lead 66 and lead 59 to lead 67. This reverses the polarity in which capacitors 55, 56, 57 and 58 are connected to the generator field. This reversal in the connection of capacitors 55 to 58, inclusive, to the generator field causes the charge on these capacitors to flow through the generator field winding in a direction opposite to that from the normal current flow through that winding. This decreases the decay time of the generator field to a very few milliseconds. As a result the total generator output is reduced to zero in a very small time interval and damage to the generator, busses, and loads is avoided.

The capacitors 55 to 58, inclusive, which act as the charge storing means for providing a reverse current through the generator field may be any of the many well known energy storage means which can provide a current flow when connected to a load. The only requirement is that the energy storage means is capable of providing the necessary current flow with a minimum of time delay. This means that inductive materials having a rectangular hysteresis loop may be used as the charge storing means as well as certain ferro-electric storage devices that are available.

When overload actuating relay 18 is energized the latch 42, being spring loaded, will thus be moved into a downward position and will hold the movable contacts 25 and 35 of relay 18 in their energized position until reset by actuation of a reset switch (not shown) which applies power to the overload hold relay coil 41 and unlatches the latch 42. This will return all relays to their normal operating position and capacitor storage units 55 to 58 are returned to their original connection for recharging from the excitation source voltage.

While there has been shown and described an invention in connection with certain specific embodiments it will, of course, be understood that it is not wished nor intended to be limited thereto, since it is apparent that the principles herein disclosed are susceptible of numerous other applications, and modifications may be made in the circuit arrangement and in the instrumentalities employed without departing from the spirit and scope of this invention as set forth in the appended claims.

What is claimed is:

1. An overload protection device for direct current generators comprising a direct current generator having a generator field winding, an excitation voltage source for said generator field winding, a first actuable switching means for connecting in one position said excitation voltage to said generator field winding, said excitation voltage being disconnected from said generator field winding in another position of said first switching means, an output bus connected to said direct current generator, means for sensing an excessive amount of current in said output bus, overload actuating means operated by said sensing means, charge storing means, a second actuable switching means connecting in one position said charge storing means to said excitation voltage, said second switching means in another position connecting said charge storing means to said generator field winding in a polarity opposite to that normally applied to said generator field winding, said overload actuating means being operated by said sensing means whenever an excessive amount of current is sensed by said sensing means, said first and second switching means being actuated to their other position whenever said overload actuating means are operated by said sensing means.

2. An overload protection device according to claim 1 having an overload hold means, said overload hold means being actuated when said overload actuating means is actuated, said overload hold means while actuated preventing deactuation of said overload actuating means.

3. An overload protection device for direct current generators comprising a direct current generator having a generator field winding, an excitation voltage source for said generator field winding, a first actuable switching means for connecting in one position said excitation voltage to said generator field winding, said excitation voltage being disconnected from said generator field winding in another position of said first switching means, a D.C. output from said direct current generator, means for sensing an excessive amount of current in said output, overload actuating means operated by said sensing means, charge storing means, a second actuable switching means connecting in one position said charge storing means to a D.C. potential, said D.C. potential storing a charge in said charge storing means, said second switching means in another position connecting said charge storing means D.C. potential to said generator field winding in a polarity opposite to that normally applied to said generator field winding, said overload actuating means being operated by said sensing means whenever an excessive amount of current is sensed by said sensing means, said first and second switching means being actuated to their other position whenever said overload actuating means are operated by said sensing means.

4. An overload protection device for direct current generators comprising a direct current generator having at least one generator field winding, a first actuable switching means having two positions, a field voltage applied to said generator field windings through said first switching means in one of said two positions, a D.C. output from said direct current generator, means for sensing an excessive amount of D.C. output from said direct current generator, overload actuating means operated by said sensing means, charge storing means, a second actuable switching means having two positions, said second switching means connecting in one of said two positions said charge storing means to a D.C. current so as to charge said charge storing means, said second switching means in the other of said two positions connecting said charge of said charge storing means to at least one of said generator field windings in a polarity opposite to that normally applied to said generator field winding, said overload actuating means being operated by said sensing means whenever an excessive amount of current is sensed by said sensing means, said first and second switching means being actuated to the other of their two positions whenever said overload actuating means are operated by said sensing means.

5. An overload protection device according to claim 4 having an overload hold means, said overload hold means being actuated when said overload actuating means is actuated, said overload hold means while actuated preventing deactuation of said overload actuating means.

6. An overload protection device according to claim 4 in which said charge storing means are a plurality of capacitors.

7. An overload protection device according to claim 4 in which an indicator device is energized by said overload actuating means.

8. An overload protection device according to claim 6 in which said overload actuating means and first and second switching means are energized by an alternating current voltage.

9. An overload protection device according to claim 6 in which said means for sensing an excessive amount of D.C. output comprise a line shunt resistor connected in series with a relay and calibrating resistor.

10. An overload protection device for direct current generators comprising a direct current generator having a generator field winding, a first actuable switching means having two positions, a field voltage applied to said generator field windings through said first switching means in one of said two positions, a D.C. output from said direct current generator, means for sensing an excessive amount of D.C. output from said direct current generator, overload actuating means operated by said sensing means, a capacitor storage, a second actuable switching means having two positions, said second switching means connecting in one of said two positions said capacitor storage to a D.C. potential so as to charge said capacitor storage, said second switching means in the other of said two positions connecting said charge of said capacitor storage to said generator field winding in a polarity opposite to that normally applied to said generator field winding, said overload actuating means being operated by said sesing means whenever an excessive amount of current is sensed by said sensing means, said first and second switching means being actuated to the other of their two positions whenever said overload actuating means are operated by said sensing means.

11. An overload protection device for direct current generators comprising a direct current generator having a generator field winding, a first actuable switching means having two positions, a field voltage applied to said generator field windings through said first switching means in one of said two positions, a D.C. output from said direct current generator, means for sensing an excessive amount of D.C. output from said direct current generator, overload actuating means operated by said sensing means, an energy storage device, a second actuable switching means having two positions, said second switching means connecting in one of said two positions said energy storage device to a D.C. potential so as to charge said energy storage device, said second switching means in the other of said two positions connecting said charge of said energy storage device to said generator field winding in a directional sense opposite to that normally applied to said generator field winding, said overload actuating means being operated by said sensing means whenever an excessive amount of current is sensed by said sensing means, said first and second switching means being actuated to the other of their two positions whenever said overload actuating means are operated by said sensing means.

References Cited in the file of this patent

UNITED STATES PATENTS

| 2,468,743 | Frost | May 3, 1949 |
| 2,677,076 | James | April 27, 1954 |
| 2,855,546 | Markowitz | Oct. 7, 1958 |

FOREIGN PATENTS

| 156,868 | Great Britain | Jan. 20, 1921 |
| 302,973 | Great Britain | Dec. 24, 1928 |